United States Patent [19]
Johnson

[11] 3,708,737
[45] Jan. 2, 1973

[54] ELECTRIC MOTOR SPEED SENSING

[75] Inventor: Harold Johnson, Sherman Oaks, Calif.

[73] Assignee: California Data Corporation, Van Nuys, Calif.

[22] Filed: May 19, 1971

[21] Appl. No.: 144,901

[52] U.S. Cl. .................... 318/636, 318/616, 318/331
[51] Int. Cl. ............................................. G05b 21/02
[58] Field of Search............... 318/616, 636, 599, 331

[56] References Cited

UNITED STATES PATENTS

| | | | |
|---|---|---|---|
| 2,905,876 | 9/1959 | Hillman | 318/331 X |
| 3,519,906 | 7/1970 | Kubler | 318/616 X |
| 3,027,505 | 3/1962 | Auld, Jr. | 318/331 |
| 3,504,260 | 3/1970 | Staples | 318/331 |
| 2,618,674 | 11/1952 | Stanton | 318/636 X |
| 2,713,135 | 7/1955 | Macklem | 318/636 X |
| 3,436,636 | 4/1969 | James | 318/636 X |

*Primary Examiner*—T. E. Lynch
*Attorney*—White, Haefliger and Bachand

[57] ABSTRACT

Electrical motor speed sensing circuitry comprises:
- a. a current generator remaining electrically connected in current supplying relation with the motor, the generator having a control input,
- b. input control means to alternate the generator input between a first signal level during first time intervals in which the motor is engergized by the generator to drive a load, and a second signal level during second time intervals in which the motor coasts, and
- c. sensing means operable to sample values of the motor back EMF during said second intervals. For servo operation, the input means may include a summing junction having a reference signal input and an input for a feed-back signal derived in response to operation of the sensing means.

14 Claims, 6 Drawing Figures

INVENTOR.
HAROLD JOHNSON

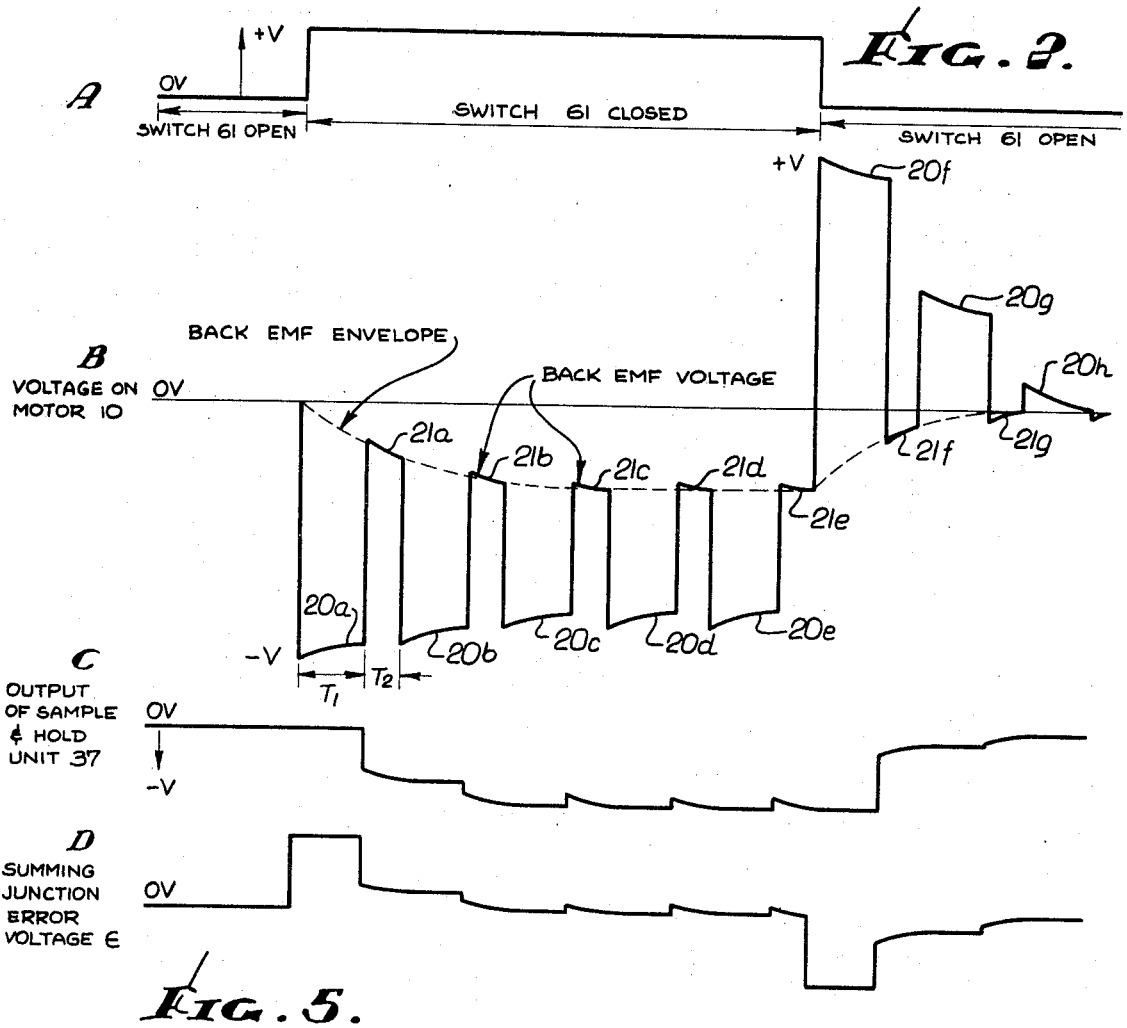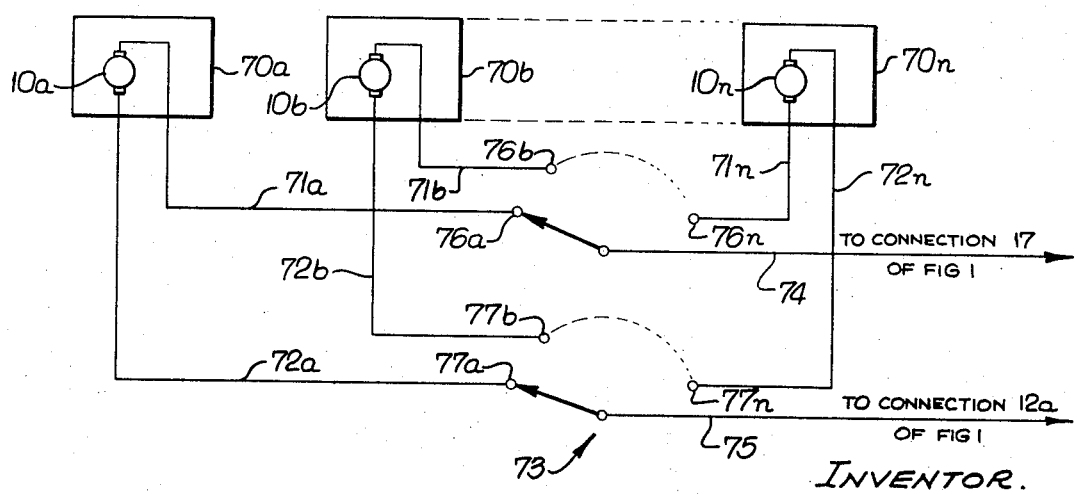

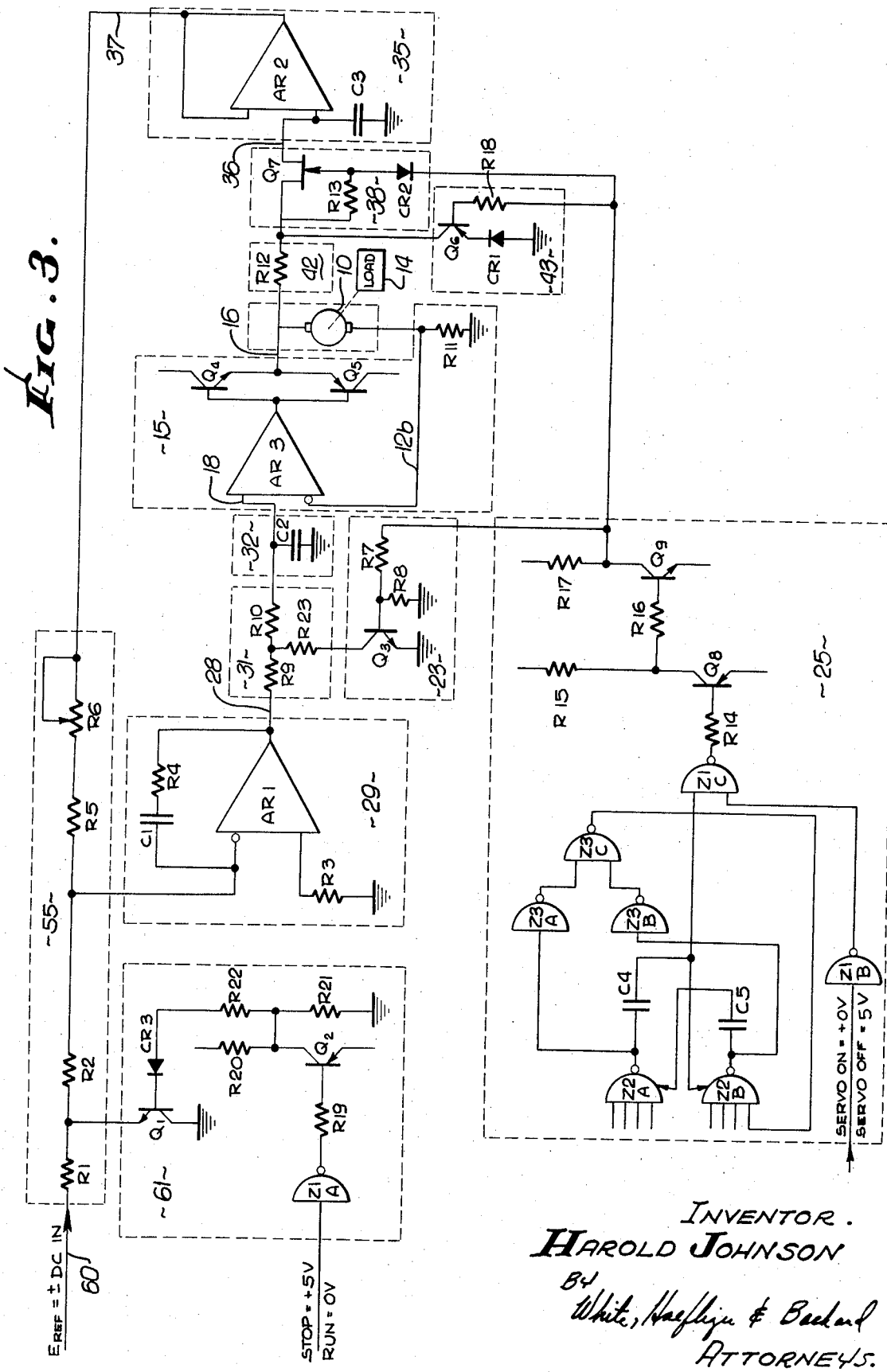

ELECTRIC MOTOR SPEED SENSING

BACKGROUND OF THE INVENTION

This invention relates generally to electric motor speed sensing, and more particularly concerns the elimination of disadvantages associated with known motor speed sensing methods, and particularly as used in servo stabilization, motor speed control, and monitoring for various applications.

One current method used to sense motor speed involves use of a tachometer attached to or made integral with the motor. Because the tachometer is not required to supply electrical power, its open circuit generated voltage is a measure of the motor speed. In essence, this results in the need for two motors, one used as a source of mechanical power and the other as a speed sensor, which is a cost disadvantage. In addition, the two motor system disadvantageously increases the inertia of the system.

Another method involves use of bridging or nulling technique, wherein the self-generated EMF of the motor is sensed by balancing out the voltage applied to the motor; however, inaccuracies arise due to the fact that nulling accuracy is dependent upon motor armature resistance, which in turn varies with motor internal temperature. A more serious problem derives from the fact that back EMF is sensed while the motor is under load, and therefore has a significant amount of armature current. Under this condition, a large transient voltage is introduced each time the motor commutates, the amplitude of the transient being proportional to the armature current. The transient is especially manifest because at the time of commutation the armature resistance varies considerably, which causes a transient imbalance in the nulling circuit.

In another method, the incremental tachometer method, a disc is mechanically connected to the shaft of the motor, and the disc is coded to produce, by sensing, a known number of pulses for each revolution of the shaft. The pulses represent shaft position, and by appropriate circuitry these position pulses may be differentiated to produce velocity data. Of disadvantage is the fact that the disc adds to motor rotor inertia, it must be kept accurately aligned, and it is relatively expensive. A still further method involves periodic disconnection of the motor current source from the motor, and sampling the motor back EMF, as for comparison of the latter with a reference signal to produce an error signal. The principal disadvantage with this procedure lies in the need for high power switches and the uncontrollable generation of undesirably large transients due to periodic interruption of large currents and voltages.

SUMMARY OF THE INVENTION

It is a major object of the present invention to obviate the above problems associated with known systems through provision of unusually advantageous motor speed sensing circuitry requiring no tachometer or coded disc, and only one motor. Basically, the circuitry comprises:

a. a current source or generator remaining electrically connected in current supplying relation with the motor, the generator having a control input, the current generator being of unipolar or bipolar output.

b. input control means to alternate the generator input between a first signal level during first time intervals in which the motor is energized by the generator to drive a load, and a second signal level during second time intervals in which the motor coasts, and c. sensing means operable to sample and hold values of the motor back EMF during said second intervals.

As will be seen the input control means may include input switch mechanism operable to alternate the generator input between the first and second levels, and with timing characterized in that, in general, individual durations of the first time intervals exceed the individual durations of the second time intervals, though the individual durations are not limited to the above. In servo application of the speed sensor, a summing junction may have a reference signal input together with another input for a feed-back signal derived in response to operation of the sensing means. The summing junction "error" output may then be used to control a device, as for example an amplifier, which supplies the first signal level to the switch mechanism, there being an attenuator network also responsive to the device output to supply the second signal level to the switch mechanism. The attenuator network characteristics encompassing, by pre-selection, the range of infinite attenuation to zero attenuation of the input signal to the network.

The sensing means may include a sample and hold circuit having an input, and sample and hold switch mechanism electrically connected between the motor and the input to the sample and hold circuit; and additional circuitry may synchronously control both the sample and hold switch mechanism and the input switch mechanism.

Further, the motor load may be in the form of a stored informational media drive element operatively connected in driven relation with the motor, that element, for example, comprising a magnetic tape drive capstan, or any other mechanism requiring rotational motion.

Further, since only the two motor leads are required for power application to the motor as well as speed sensing, without the need for auxiliary speed sensing devices on the motor, the system may be easily multiplexed to control a multitude of motors with only one common set of electronics. This provides an inexpensive form of multiple motor control, since only two wires are switched. The motor load may be in the form of the magnetic tape drive capstan or any other mechanism requiring rotational motion as described above.

DRAWING DESCRIPTION

FIG. 2 is a wave form diagram;

FIG. 3 is a more detailed circuit diagram of the FIG. 1 servo-loop components;

FIG. 5 shows one application of multiple motor control with one common set of electronics.

DETAILED DESCRIPTION

Figure 1:
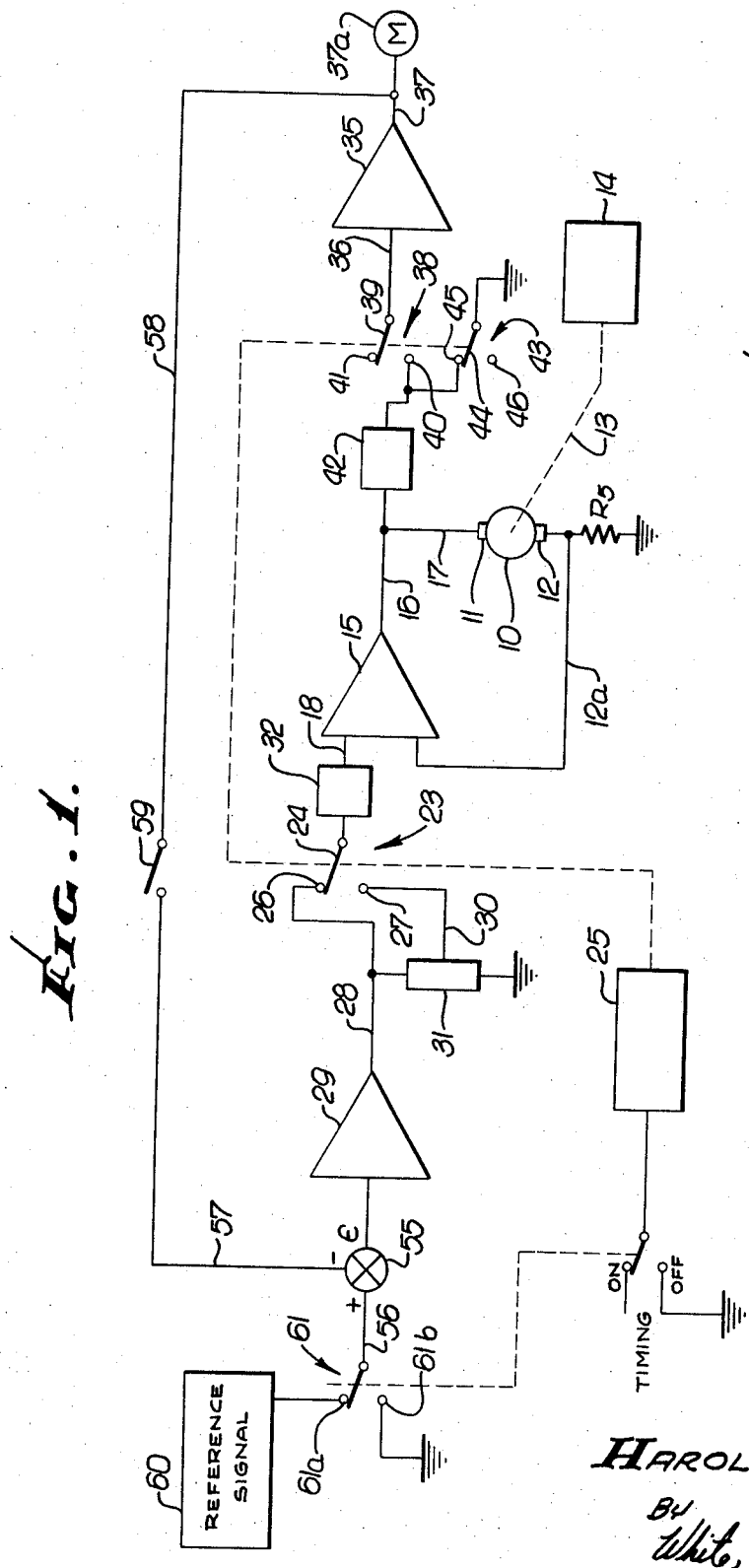
FIG. 1 is a block diagram of the motor speed sensor connected in a servo-loop.

Referring first to FIG. 1, a DC motor 10 has terminals 11 and 12, the latter being grounded via resistance $R_s$, and the motor output shaft being shown connected at 13 to a load 14. A current source of generator, such as a power amplifier indicated at 15, configured with current feedback at 12a, remains electrically connected (as by leads 16 and 17) in current supplying relation with the motor armature. Other suitable current sources may be used.

Figure 1A:
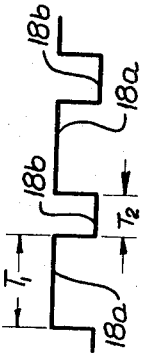
FIG. 1a is a wave form diagram.

In order to provide for motor speed sensing in the manner to be described, input means is provided to alternate the amplifier input at 18 between a first signal level or levels during first time intervals $T_1$ in which the motor is energized by the amplifier 15 to drive the load 14, and a second signal level or levels, normally zero volts, during second time intervals $T_2$ in which the motor rotor coasts. Current source linear amplifier 15 will, in this regard, have a high impedance output, and supply negligible current to the motor. One example of such time intervals is seen in FIG. 1a, with associated first and second amplifier signal input levels 18a and 18b. Another example of such time intervals is seen in waveform B in FIG. 2, wherein operation in a servo system is represented, the voltage application to the motor during intervals $T_1$ appearing at 20a, 20b — 20h, and the back or counter EMF of the motor associated with $T_2$ intervals appearing at 21a, 21b — 21g. Such operation will be more completely described later. To complete the basic motor speed sensing circuitry description, sensing means (of typically high impedance) is operable to sample values of the motor back EMF during the $T_2$ time intervals. The recurrence rate of intervals $T_2$ may be varied within wide limits, and may be made extremely high for use of the speed sensing circuitry in a servo loop as will be described. In this regard, the multiplexing rate may be sufficiently high that the motor does not respond to pulsating armature current.

More specifically, the referred to input means may include input switch mechanism, as for example is indicated at 23, operable to switch the amplifier input at 18 between the described first and second input levels. Merely as illustrative, switch 23 may have a switch arm 24, or equivalent, which is operated as by controller 25 between contacts 26 and 27. The first or relatively high signal level may be supplied to contact 26 on an output lead 28 from a device such as amplifier 29, and in this regard in the servo system to be described the device 29 may function as a gain control and equalizer amplifier. The second or relatively low signal level may be supplied to contact 27 in an output lead 30 from attenuator network 31, the input to which is from lead 28. Switch arm 24 is in turn electrically connected to the input 18 of amplifier 15, as for example, via a shaping network 32 operable to minimize any transients in the voltage supply to the motor arising from ON and OFF operation of switch 23, i.e., associated with movement of arm 24 between the contacts 26 and 27. Switch 23 may in practice comprise an electronic switch.

The referred to sensing means to sample values of the motor back EMF during the $T_2$ intervals may include a sample and hold unit or amplifier 35 having an input 36 and output 37, and sample and hold switching mechanism 38 electrically connected between the motor terminal 11 or to motor terminal 11 through isolator 42 and amplifier input 36. Merely as illustrative, mechanism 38 may include a switch arm 39, or equivalent, which is also operated by controller 25 between contacts 40 and 41, and which is connected with input 36. "ON" contact is connected via isolator network 42 with leads 16 and 17, as shown, whereas "OFF" contact is not used. Another switch mechanism 43 may be provided to prevent or reduce current leakage across switch 38 when arm 39 engages contact 41. Switch 43 includes an arm 44, also operated by control 25, that engages a contact 45 connected with contact 40 to ground the latter when arm 39 engages contact 41. Arm 44 disengages contact 45 and engages an unused contact 46 when arm 39 engages contact 40. Isolation network 42 prevents loading of amplifier 15 when arm 44 engages contact 45, as shown. Switch mechanism 38 and 43 may likewise comprise electronic switches.

Considering the operation of the motor speed sensor, during "motor mode" intervals $T_1$, current is delivered to the motor, which then develops mechanical power. In this mode neither temperature or commutator transient spikes are a problem, since the motor speed is not sampled. During the "tachometer mode", interval $T_2$, the back EMF of the motor is sensed. With no motor current, and a high impedance sensing circuit, the commutation spikes are negligible and the motor armature resistance introduces negligible error; i.e., a high impedance sensing circuit eliminates variations in armature resistance. The multiplexing rate may be sufficiently high such that the motor is not able to respond to the pulsating armature current.

Typically, the "OFF" time $T_2$ is determined by the time required for the motor armature current to decay from its load value to some minimum value. The "ON" time is determined by the minimum required sampling rate of the system. Usually the sum of the ON and OFF times is chosen to be between one-third and one-tenth of the motor time constant.

To further understand the system, consider the following derivation of its transfer function, $\omega_o/E_1$, assuming sampling rate is considerably greater than the system bandwidth; thus, the sampled system may be approximated by linear techniques, wherein the following applicable parameters are defined:

$E_1$ = Voltage at 18; volts
$\omega_o$ = Angular Speed of Motor
$K_a$ = Motor Torque Constant; In. Oz./Amp.
$K_g$ = Motor Back EMF; V/Rad./Sec.
$J_m$ = Motor Inertia; In. Oz. Sec.$^2$
$R_a$ = Motor Armature Resistance; Ohms
$S$ = Laplace Operator
$T_o$ = $1/f = T_1 + T_2$
$f$ = Sampling Frequency
$R_s$ = Resistance
$T$ = Delivered Torque at Motor It can be shown by classical motor theory that:

$$\omega_o = [T_1/T_o][E_1/R_s][K_a/S J_m] \qquad (1)$$

Equation (1) shows that the system transfer function has been modified by the constant $T_1/T_o$ which effectively lowers the gain of the motor. This is of no consequence to the system since this can easily be compensated by system electronic gain.

During time $T_2$ the armature current is reduced to zero because the input to the amplifier 15 is reduced to zero or near zero. Because of the current drive, the motor is not damped during $T_2$ and merely coasts. Mechanical loading will tend to decrease the motor speed during $T_2$; however, if the interval, $T_2$, is short, the loading will have insignificant effect on the speed and the motor back EMF terminal voltage will be an accurate measure of its speed.

Figure 4:
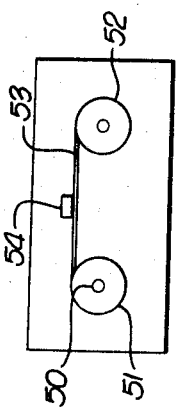
FIG. 4 shows one application of the invention.

FIG. 1 also illustrates the manner in which the motor speed sensor may be connected in a servo-loop, to maintain the motor output shaft speed, and therefore the drive of load 13, at a predetermined value. In this regard, one important application of such a servoed system is the drive of an information media capstan as for example, magnetic tape, disc or other drive capstan. Merely as illustrative, a load in the form of a tape roll drive capstan is indicated at 50 in FIG. 4, tape rolls 51 and 52, tape 53, and a read/write head 54 also being illustrated. Also in FIG. 1 the voltage at 37 is a measure of the motor speed and a meter or monitoring device 37a connected at 37 provides a visual readout of the motor speed.

In FIG. 1 the input means previously described may also be considered to include a summing junction, as for example is indicated at 55, having a reference signal input 56 and an input 57 for a feed-back signal derived in response to operation of the sensing means. More specifically, the output 37 of the sample and hold amplifier or circuit 35 may be connected via lead 58 and switch 59 therein to the summing junction input 57. Thus, servo operation may be initiated when switch 59 is on and a reference signal from a source 60 is applied via a switch 61 to input 56.

During $T_1$, the input to amplifier 35 is opened through switch 38 and 35 stores, or remembers, the back EMF of the motor that existed just prior to $T_1$. This stored voltage, proportional to the motor speed, is then added to the reference signal through the summing junction or adder 55 and the output or error signal $\epsilon$ is fed to 29. The "adding" process is actually a subtraction process, since the polarity of the output of sample and hold amplifier 35 is opposite to that of the reference signal. The output of amplifier 29 will therefore be proportional to the difference or error between the reference signal and the stored motor back EMF. The signal at 28 is applied to current generator 15 and its output will drive the motor in such a direction that it will tend to lower the error signal $\epsilon$. Also during this time the applied motor voltage is prevented from leaking through switch 38.

The servo system continually operates in the above mode, always correcting to maintain the motor back EMF to such an amplitude that the output of summing junction 55 will be near zero.

When switch 61 is open and lead 56 connected to unused contact 61b, the reference voltage at 56 is zero, and the only way the motor back EMF can be zero is for the motor to stop rotating. However, the motor will in practice very slowly rotate, or creep, due to sources of drift voltages such as amplifier and switch offset voltages. To prevent such creep, the timing circuit 25 may be turned off, which leaves switches 23, 38 and 43 opposite to the illustrated positions, as during time $T_2$. Under this condition, the servo gain is lowered sufficiently by attenuator 31 that the motor armature will not rotate; however, the gain of the system may be sufficiently high to maintain the circuits in their linear operating ranges. This is desired to ensure that response time will not slow down due to initially saturated elements.

FIG. 2 shows the main waveforms A, B, C and D of the servo system. Waveform A illustrates the input voltage at 56 when switch 61 applies the reference signal and then zero volts to the input junction 55. Waveform B shows the voltage 20a, 20b — 20h applied to the input of the motor. During the $T_1$ intervals the motor is driven in accordance with the error voltage $\epsilon$ represented by the sum of waveforms A and C. The latter is obtained at the output 37 of the sample and hold amplifier 35. During the $T_2$ intervals, the voltage at the motor attains its back EMF values.

FIG. 3 shows one method of implementation of the servo block of FIG. 1. All elements marked AR are DC coupled operational amplifiers, the Z elements are logic NAND gates and the Q elements are transistors. The broken line blocks with the enclosed numerals show the implementation of the corresponding numbered elements of FIG. 1.

In block 61 with zero volts applied to Z1A its output will be at +5V causing $Q_2$ to cut off. With $Q_2$ cut off, the voltage at the anode of diode CR3 will be −4 volts, causing $Q_1$ to be cut off. This allows the input signal $E_{ref}$ to be applied to one end of the summing junction 55. $Q_1$ will remain cut off for all input signals $\leq |\pm 10|$ volts. The polarity of the input signal determines the direction of rotation of motor 10. Diode CR3 ensures that the reverse bias from the base to the emitter of $Q_1$ is held below its breakdown value. With +5 volts applied to Z1A, the output of $Q_2$ will be +5 volts causing $Q_1$ to saturate, clamping the junction of $R_1$ and $R_2$ to near ground. The inverted connection of $Q_1$ provides a clamp of a few millivolts above ground. With $Q_1$ saturated, the input voltage to the summing junction 55 is effectively zero volts. Thus, in accordance with the command signal input to Z1A, the reference input voltage to the servo is switched from its input value or ground.

The summing junction 55 is comprised of a resistor network. The servo will adjust itself until the back EMF of the motor, as stored on the output at 37 of AR2 obeys the following equation:

$$E_{o2} = E_{ref} \frac{R_5 + R_6}{R_1 + R_2} \qquad (2)$$

Observe from this equation that $E_{o2}$ can be changed by varying either $E_{ref}$ or the resistor network. This provides a convenient method of adjusting the motor speed. As shown in block 55, this adjustment is provided by potentiometer $R_6$.

Block 29 is an operational amplifier with a very high static gain (typically 50,000) and a frequency roll off network from its output to input. This roll off network provides the total servo stabilization.

Block 25 is the timing circuit for the electronic switches. Z2A and Z2B are cross coupled to form a conventional multivibrator with a starter circuit comprised of Z3A, Z3B and Z3C. The starter circuit is required since, on initial turn on, Z2A and Z2B may both be in saturation, causing the loop gain of the multivibrator to be insufficient for oscillation. If this condition does exist, the output of Z3C will be low, forcing Z2B output to go high. This will force the system into oscillation and thereafter Z3C will remain high since Z2A and Z2B will be complementary. Once Z3C is high, it has no further effect on Z2B. Capacitors $C_4$ and $C_5$ are adjusted to provide a duty cycle of approximately one third; i.e. $T_1 \cong 2T_2$. The output of the multivibrator is fed to gate Z1C and the output of Z1C is controlled by the command signal into Z1B. With the input to Z1B at zero volts, the multivibrator signal is allowed to pass thru Z1C. This permits the system to servo. With the input to Z1B at +5V the output of Z1C is held at a constant +5V which turns the servo off. The output of Z1C is level shifted to +5V and −12V by $Q_8$ and this level is further shifted by $Q_9$ to ±12 volts to provide the appropriate voltage to FET switch $Q_7$ in block 38. Due to loading effects of $R_7$ and $R_8$, the voltage at the collector of $Q_9$ will swing from −12 volts to +11 volts.

Block 31 is a resistor attenuator network consisting of $R_9$, $R_{10}$ and $R_{23}$. With $Q_3$ cut off the output of AR1 is passed directly to the input of AR3 in block 15 without attenuation. With $Q_3$ in saturation, the input of AR3 is attenuated by the ratio $(R_{23} + R_{sat})/(R_9 + R_{23} + R_{sat})$, where $R_{sat}$ = saturation resistance of $Q_3$. This attenuation is typically set up for 1/100 to 1/1000.

Block 32 is simply a capacitor which, in conjunction with $R_9$ and $R_{10}$, forms a lag network. This lag produces an exponential rise and fall to the input of AR3 as $Q_3$ is switched on and off. This exponential voltage minimizes the amplitude of the transient voltages generated at the motor due to the motor inductance.

Block 15 consists of an operational amplifier with a complementary output power stage, the complementary output providing bipolar output for bidirectional rotation of the motor. The feedback loop, comprised of the motor and current sampling resistor R11 and lead 12b, transforms the amplifier to appear as a current source to the motor. Thus, the impedance drive to the motor always appears extremely high. This ensures that the motor is not electrically damped when transistor $Q_3$ clamps to ground.

Block 42 consists simply of an isolation resistor. During the time $T_1$ that the motor is being powered by amplifier 15, $Q_6$ maintains the source voltage at $Q_7$ near ground. This ensures that the hold voltage on capacitor C3 is not varied as a result of the back EMF leaking across $Q_7$. The current into the isolation resistor is negligible compared to the motor current.

Block 38 is a series switch comprised of an FET transistor. During $T_2$, the sample time, the collector of $Q_9$ is at +11 volts, $Q_6$ is cutoff and the back EMF of the motor charges C3 through $R_{12}$ and $Q_7$. During $T_1$, the collector of $Q_9$ is at −12 volts which causes $Q_6$ to conduct and through diode CR2 applies −12 to be applied to the gate of $Q_7$. With near zero volts at the source and −12 V at the gate, FET $Q_7$ is effectively cut off and the voltage on C3 remains stored.

Block 43 is simply a transistor which is either cut off or saturated and performs the function of a shunt switch.

Block 35 is an operational amplifier with unity feedback which appears as a high impedance to the stored voltage on C3. It provides the power to the summing network without discharging C3.

In FIG. 5, multiple motors 10a, 10b — 10n may for example be associated with the drives of multiple tape transports indicated at 70a, 70b — 70n. The latter are also illustrative of other driven devices. The motor leads are indicated at 71a, 72a; 71b, 72b, and 71n, 72n, respectively. Switch means 73 is provided to selectively connect these pairs of leads to the leads 74 and 75 which are in turn connected to leads 17 and 12a in FIG. 1. Thus, when switch arms 74 and 75 are in the position shown contacting terminals 76a and 77a, motor 10a is controlled as described. Other pairs of terminals are indicated at 76b and 77b, and at 76n, 77n. Since only the two motor leads at each station require switching, this provides an extremely inexpensive system for the control of a multitude of motors. This is especially important, for example, in the control of multiple tape transports where many transports are required in a system operating, by selection, one at a time. As is clear, the sharing of one common electronics with a simple switching network is considerably less expensive than multiple electronics with no switching.

I claim:

1. Electrical motor speed sensing circuitry comprising
   a. a current generator remaining at all operating times electrically connected in current supplying relation with the motor, the generator having a control input, the generator comprising a linear amplifier that converts a voltage source input to a proportional current source output,
   b. input control means to alternate the generator input between a first signal level during first time intervals in which the motor is energized by the generator to drive a load, and a second signal level during second time intervals in which the motor coasts, and
   c. sensing means operable to sample and hold values of the motor full back EMF only during said second intervals.

2. The circuitry of claim 1 including the motor.

3. The circuitry of claim 1 wherein said input control means includes input switch mechanism operable to alternate the generator input between said first and second levels, and a shaping network connected between the switch mechanism and the generator to minimize transient voltages generated at the motor.

4. The circuitry of claim 3 wherein said input means includes a summing junction having a reference signal input and an input for a feed-back signal derived in response to operation of said sensing means.

5. The circuitry of claim 4 wherein said input means includes a device responsive to the output of said summing junction to supply said first signal level to said switch mechanism and an attenuator network responsive to the output of said device to supply said second signal level to said switch mechanism.

6. The circuitry of claim 1 wherein said sensing means includes a sample and hold circuit having an input, and sample and hold switch mechanism electrically connected between the motor and the input of the sample and hold circuit.

7. The circuitry of claim 6 wherein said input means includes a summing junction having a reference signal input, and another input electrically connected with the sample and hold circuit output.

8. The circuitry of claim 7 including circuitry to synchronously control said input switch mechanism and said sample and hold switch mechanism.

9. The circuitry of claim 1 including said motor, and a load in the form of a stored informational media drive element operatively connected in driven relation with the motor.

10. The circuitry of claim 9 wherein said media drive element comprises a magnetic tape drive capstan.

11. The circuitry of claim 9 including a pair of magnetic tape rolls between which tape is transported in response to rotation of said drive element, and a magnetic head past which the transported tape is adjacently movable.

12. The circuitry as defined in claim 1 including multiple electrical motors and switch means to selectively connect the generator in current supplying relation with said motors.

13. The circuitry of claim 12 including multiple loads in the form of stored informational media drive elements respectively operatively connected in driven relation with said motors.

14. The circuitry of claim 1 wherein said generator includes means to supply bipolar output current.

* * * * *